(12) United States Patent
Raynor et al.

(10) Patent No.: US 8,878,830 B2
(45) Date of Patent: Nov. 4, 2014

(54) AMBIENT LIGHT DETECTION

(75) Inventors: Jeffrey Raynor, Edinburgh (GB); Abdelouahid Zakriti, Bouskoura (MA); Stephane Vivien, Grenoble (FR); Pascal Mellot, Lans en Vercours (FR)

(73) Assignees: STMicroelectronics (Research & Development) Limited, Marlow (GB); STMicroelectronics SAS (Moroc), Bouskoura, MA (US); STMicroelectronics (Grenoble 2) SAS, Grenoble (FR)

( * ) Notice: Subject to any disclaimer, the term of this patent is extended or adjusted under 35 U.S.C. 154(b) by 418 days.

(21) Appl. No.: 12/884,986

(22) Filed: Sep. 17, 2010

(65) Prior Publication Data
US 2011/0141078 A1    Jun. 16, 2011

(30) Foreign Application Priority Data
Sep. 25, 2009    (GB) .................... 0916883.2

(51) Int. Cl.
*G09G 5/00*    (2006.01)
*G01J 1/18*    (2006.01)
*G01J 1/46*    (2006.01)

(52) U.S. Cl.
CPC ..... *G01J 1/18* (2013.01); *G01J 1/46* (2013.01)
USPC .................. 345/207; 250/214 AL; 250/252.1

(58) Field of Classification Search
USPC ......... 345/207; 250/214 AL, 363.09, 252.01; 348/294–324
See application file for complete search history.

(56) References Cited

U.S. PATENT DOCUMENTS

| | | | | |
|---|---|---|---|---|
| 4,114,149 A | * | 9/1978 | Kendall | 341/127 |
| 5,889,883 A | * | 3/1999 | Simpkins | 382/135 |
| 6,011,251 A | * | 1/2000 | Dierickx et al. | 250/208.1 |
| 6,545,776 B1 | * | 4/2003 | Machida et al. | 358/482 |
| 6,559,788 B1 | * | 5/2003 | Murphy | 341/164 |
| 6,873,282 B1 | * | 3/2005 | Murphy | 341/164 |
| 6,975,008 B2 | * | 12/2005 | Cok | 257/414 |
| 6,977,685 B1 | * | 12/2005 | Acosta-Serafini et al. | 348/308 |
| 7,202,463 B1 | * | 4/2007 | Cox | 250/214 R |

(Continued)

FOREIGN PATENT DOCUMENTS

| | | |
|---|---|---|
| EP | 1939594 A2 | 7/2008 |
| EP | 1939594 A3 | 7/2008 |

(Continued)

OTHER PUBLICATIONS

Search Report, mailed Dec. 8, 2009, for GB0916883.2 (4 pages).

(Continued)

*Primary Examiner* — Dorothy Harris
(74) *Attorney, Agent, or Firm* — Gardere Wynne Sewell LLP

(57) ABSTRACT

Ambient light is detected by a photodiode circuit by measuring the time taken for a digital output of the photodiode circuit to change state in response to exposure of a photodiode of the photodiode circuit to that ambient light. A nominal time for state change is calculated based on photodiode circuit characteristics. Furthermore, an effective time for the photodiode circuit digital output to change state is determined in a calibration mode where the photodiode has been disconnected and a reference current is applied to the circuit. An illumination value of the detected ambient light is then calculated as a function of: the measured time, the effective time and the nominal time.

21 Claims, 4 Drawing Sheets

(56) References Cited

U.S. PATENT DOCUMENTS

| | | | |
|---|---|---|---|
| 7,242,429 B1* | 7/2007 | Lee et al. | 348/308 |
| 7,868,882 B2* | 1/2011 | Kobashi | 345/207 |
| 2001/0038075 A1* | 11/2001 | Morishita | 250/370.08 |
| 2002/0166949 A1* | 11/2002 | Machida | 250/208.1 |
| 2005/0051707 A1* | 3/2005 | Bamji et al. | 250/214 R |
| 2005/0218302 A1* | 10/2005 | Shin et al. | 250/214 R |
| 2005/0219094 A1* | 10/2005 | Murphy | 341/133 |
| 2007/0001833 A1* | 1/2007 | Sharma et al. | 340/468 |
| 2007/0200746 A1* | 8/2007 | Sutardja | 341/155 |
| 2007/0236590 A1* | 10/2007 | Harris | 348/308 |
| 2007/0268241 A1 | 11/2007 | Nitta et al. | |
| 2007/0284509 A1* | 12/2007 | Kobashi | 250/206 |
| 2008/0158211 A1* | 7/2008 | Kwon | 345/207 |
| 2008/0224027 A1 | 9/2008 | Kunimori et al. | |
| 2009/0206378 A1* | 8/2009 | Kim et al. | 257/292 |
| 2010/0079632 A1* | 4/2010 | Walschap et al. | 348/294 |

FOREIGN PATENT DOCUMENTS

| | | | |
|---|---|---|---|
| EP | 1939847 A2 | 7/2008 | |
| EP | 2075854 A2 | 7/2009 | |
| JP | 2002286504 A | * | 10/2002 |

OTHER PUBLICATIONS

Partial European Search Report for co-pending applicaton EP10306018 mailed Jun. 27, 2013 (7 pages).

* cited by examiner

AMBIENT LIGHT DETECTION

PRIORITY CLAIM

This application claims priority from United Kingdom Patent Application No. 0916883.2 filed Sep. 25, 2009, the disclosure of which is hereby incorporated by reference.

TECHNICAL FIELD

This invention relates to an improved method of ambient light detection, and to an improved ambient sensor.

BACKGROUND

Ambient light sensors may be used in conjunction with image displays in applications such as mobile phones and cameras, in order to adapt the display's backlighting level, thereby saving power. Current light sensors used in such applications typically have ±10% variation between parts. There is a need for ambient light sensors with improved consistency, while remaining cheap and simple to implement.

Known solutions to improved accuracy include:

Measuring the output during test and discarding those devices which are unsatisfactory. This gives a greatly reduced yield and thus increased manufacturing cost;

Measuring the output during test and adjusting a parameter, such as a resistor, by laser trimming. This adds to test cost. Also, the laser trim may re-form; and Measuring the output during test and storing a correction factor in a non-volatile memory. This can only be used in circuits suitable for incorporating non-volatile memory, and adds to test cost.

In addition, the latter two options perform calibration only at test, and do not allow for aging, temperature effects, etc.

SUMMARY

A method of sensing ambient light comprises: providing at least one light-sensitive pixel; applying a reset voltage to the pixel; allowing the pixel to integrate charge over a period of time in response to received ambient light to provide a pixel signal at the end of said period; and converting the pixel signal to digital form in an analog-to-digital converter. The method further includes performing a calibration by supplying a reference signal to the analog-to-digital converter and storing the resultant output.

Preferably, the reference signal is a reference current, and more preferably the reference current is derived by applying a reference voltage across a reference resistor.

The calibration may be performed only at switch-on; alternatively, the calibration may be performed cyclically.

From another aspect, an ambient light sensor comprises: at least one light-sensitive pixel comprising a photodiode; a timing circuit for periodically applying a reset voltage to the photodiode, allowing the pixel to integrate charge over a period of time in response to received ambient light, and outputting a resulting pixel signal; an analog-to-digital converter connected to receive said pixel signal and operative to convert it to digital form; a reference signal source for supplying a reference signal to the analog-to-digital converter; a memory connected to receive as a reference value the output of the analog-to-digital converter when the reference signal is applied thereto; and means for modifying the pixel signal in dependence on said reference value.

The reference signal source is preferably a current source; and more preferably the current source comprises a reference voltage applied across a reference resistor.

The light sensor typically forms part of an integrated circuit, in which case the reference resistor is preferably external to the integrated circuit. Preferably also, the light sensor is capable of operating to produce an unmodified pixel signal in the absence of said external resistor.

Further aspects provide a display device including an ambient light sensor as defined above, and in which the output of the ambient light sensor is used to control the contrast or backlighting of the display device; and a mobile device including such a display device and selected from the group comprising a mobile telephone, a camera, a personal digital assistant, and a portable personal computer.

BRIEF DESCRIPTION OF THE DRAWINGS

Embodiments will now be described, by way of example only, with reference to the drawings, in which.

DETAILED DESCRIPTION OF THE DRAWINGS

Figure 1:
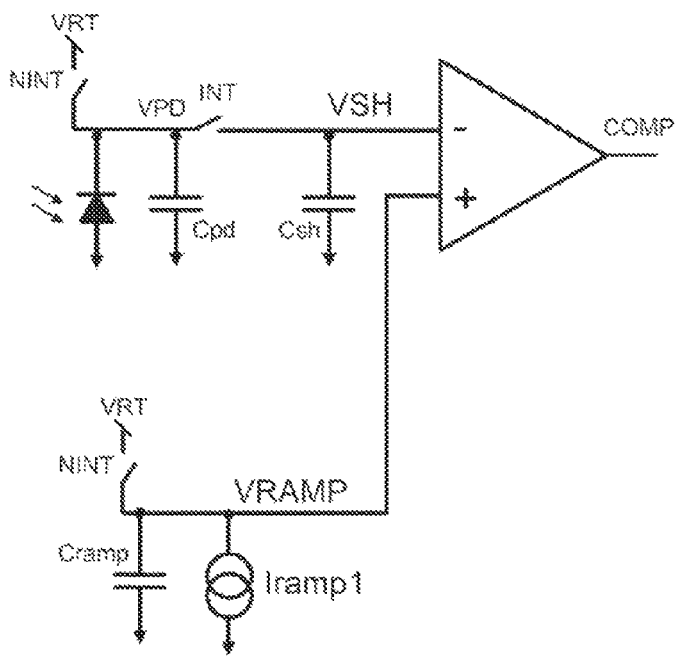
FIG. 1 is a schematic circuit of a previously proposed ambient light sensor.
Figure 2:
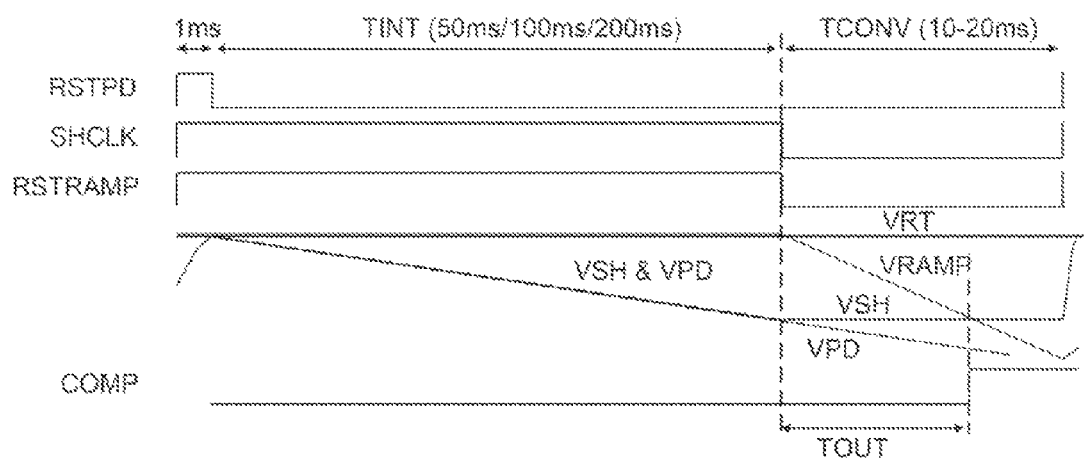
FIG. 2 is a timing diagram for the circuit of FIG. 1.

The operation of circuit shown in FIG. 1 can be seen in the timing diagram FIG. 2.

Reset Phase

The system starts with the control signals RSTPD, SHCLK and RSTRAMP all going high so that analog signals VPD, VSH and VRAMP are reset to the reference voltage "VRT". This duration is not critical—1 ms should be enough to charge the capacitors.

Integration Phase

RSTPD goes low so the photodiode is disconnected from the reference voltage and is now sensitive to light, so the voltage VPD will decay. As SHCLK is still high, the VPD voltage is connected to VSH and they will decay at the same rate:

$$d(VSH)/dt = I\text{photo}/(Cpd + Csh) \qquad (Eq\ 1)$$

Iphoto is proportional to Illumination Level×Photodiode Quantum Efficiency×Photodiode Area. Hence $$I\text{photo} = F \times Area\, PhOIO \times QE \times e/E\text{photon} \qquad (Eq\ 2)$$

where F is the illumination level W/m$^2$, Ephoton is the energy per photon (=h×c/lambda).

Hence, the VSH will decay at a rate proportional to the illumination level. At the end of the integration time ("TINT"), SHCLK goes low, disconnecting the sample/hold capacitor from the photodiode. This causes the voltage VSH to be constant (i.e. independent of light levels).

The integration time ("TINT") is not critical, but it is convenient to use an integral multiple of 50 ms. 50 ms is desirable as this period is common to both 50 Hz and 60 Hz electrical mains frequencies, rendering the sensor insensitive to variations due to lighting flicker (50 ms=5 half cycles of 50 Hz or 6 half-cycles of 60 Hz. Half-cycles because the illumination from a light source cannot be negative—i.e., it rectifies the sinusoidal signal and so repeats at twice the mains frequency).

The values of Cpd and Csh are not critical, but it is desirable to have a Csh value significantly larger than Cpd for various reasons:

- Reset/kTC noise: it is not possible to store an exact voltage on a capacitor. Due to quantum effects, the voltage will vary as $\sqrt{(kT/C)}$, where k=Boltzmann's constant, T=absolute temperature & C=Capacitance. Hence larger Csh will reduce this noise.
- Sensitivity: the integration period of 50 ms is rather long for a photodetector and it may saturate (i.e. the voltage decay so quickly that it is outside the range of the analogue-digital conversion). Increasing the capacitance will slow the decay rate. If the photodiode size is increased to increase the capacitance, it will collect more light increasing the photocurrent—thereby negating the effect of increasing the size. Hence, it is advantageous to increase the size of the Csh capacitor.
- PGA: it is also possible to change the gain of the system by having various capacitors switched in parallel—increasing the CSH capacitance will decrease the system's sensitivity.

$$I{\rm photo}=(Cpd+Csh)d(VSH)/TINT \qquad (Eq\ 3)$$

As VSH is reset to VRT, then $$d(VSH)=VRT-VSH \qquad (Eq\ 4)$$

Conversion Phase

Preferably RSTRAMP goes low, starting the ramp voltage to decay. At a time period "TOUT", the voltage on both inputs to the comparator will be equal and the output will change.

$$VSH=VRAMP\ VRT-TOUT\times(dVRAMP/dt) \qquad (Eq\ 5)$$

Equation 5 assumes that VRAMP also starts from VRT (if not an offset will be introduced). Substituting Equation 3 and Equation 4 into Equation 5:

$$I{\rm photo}=(Cpd+Csh)\times(TOUT/TINT)\times(dVRAMP/dt) \qquad (Eq\ 6)$$

If VRAMP decays linearly (dVRAMP/dt=constant), then the TOUT period will be proportional to the light level impinging on the sensor.

The decay of the VRAMP voltage is given by:

$$(dVRAMP/dt)=Iramp/Cramp \qquad (Eq\ 7)$$

Substituting Equation 7 into Equation 6 gives:

$$I{\rm photo}(Cpd+Csh)\times(TOUT/TINT)\times(Iramp/Cramp) \qquad (Eq\ 8)$$

Equation 8 shows that by measuring the time for the comparator to fire "TOUT", the photocurrent and hence the illumination impinging on the detector can be calculated:

$$Illumination=Ksystem\times TOUT/TCONV \qquad (Eq\ 9)$$

where $$Ksystem=FMax \qquad (Eq\ 10)$$

F Max is the illumination level that produces the maximum swing on the S/H capacitor maximum swing on the ramp generator.

Equation 8 also shows that if the Csh>>Cpd and also Csh and Cramp are manufactured using the same type of structure (e.g. metal-metal plate capacitor using the inter-metal dielectric as the spacer), variations in process (such as variation in the thickness of the inter-metal dielectric) will be cancelled out. For example, if the thickness of the inter-metal dielectric is nominally 500 nm but a device is manufactured with this layer at 550 nm (i.e. 10% thicker) the resulting Csh & Cramp capacitors will both be 10% smaller, but the ratio of Csh: Cramp will be the same.

Similarly, Equation 8 shows that if the internal clock—which is used to set the integration time 'TINT" and to measure the period of TOUT—is running 10% faster than nominal, the ratio of TINT:TOUT will remain unchanged.

However, Equation 8 also illustrates that accurate determination of Iphoto requires an accurate current source for Iramp.

FIG. 1 shows a capacitor (Cramp) and a current source (Iramp1) forming a linear ramp generator. An alternative would be to use a digital-analog converter (DAC) and instead of recording the time that COMP goes high, use COMP signal to record the digital value being input to the DAC.

The problem with this technique is that while it is practical to generate accurately a voltage on an integrated circuit (using a bandgap reference scheme), it is not possible to accurately generate a current. Hence the current Iramp in one device will be different to the current Iramp in another device and so these devices will produce a different value for the impinging light level, even if they receive the same amount of light.

First Embodiment

Figure 3:
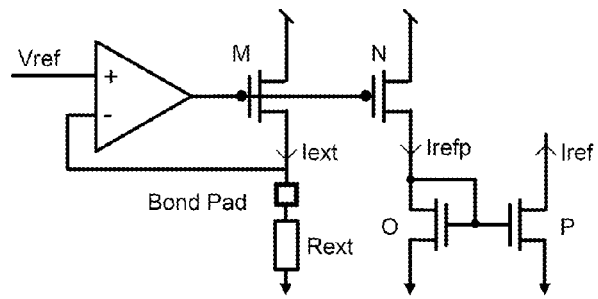
FIG. 3 is a schematic of a reference current generator.
Figure 4:
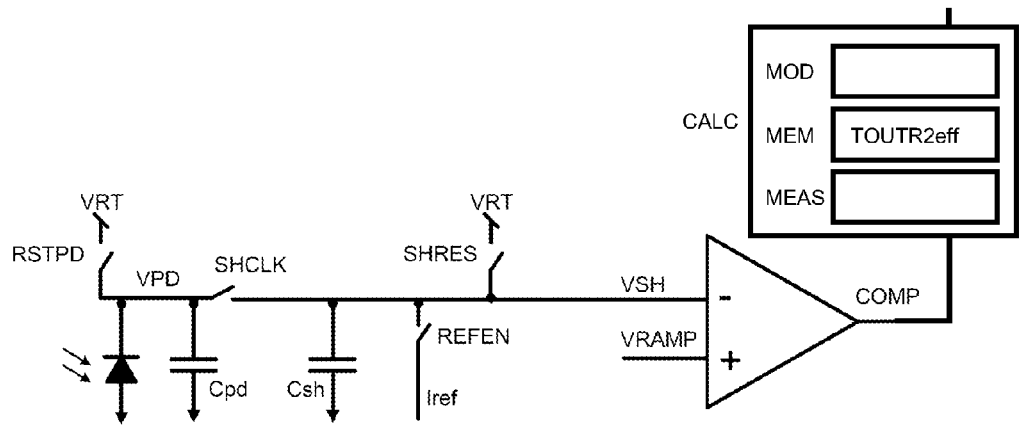
FIG. 4 is a schematic illustrating one embodiment of an ambient light sensor.
Figure 5:
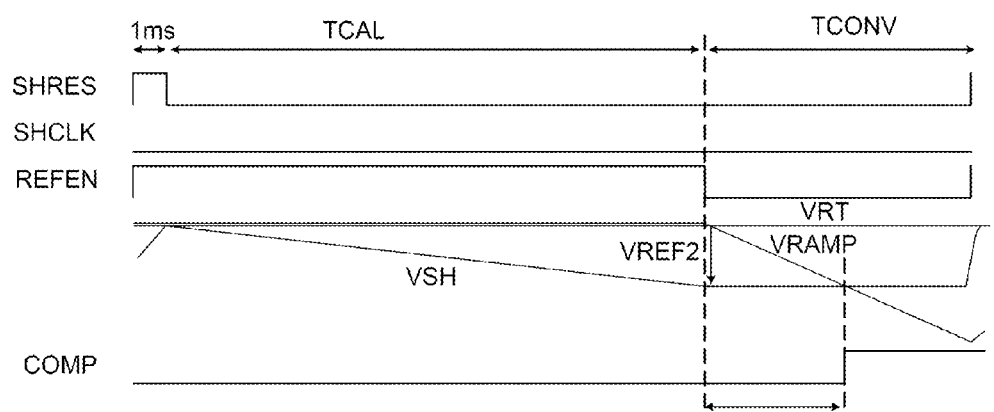
FIG. 5 is a timing diagram relating to FIG. 4.

Turning now to FIGS. 3, 4 and 5, an embodiment of a sensor will be described.

Implementation of Reference Current

FIG. 3 shows one form of reference current generator which may be used in the present embodiment, using an external resistor. A reference voltage "Vref" is input to an operational amplifier ("OTA"). Typically, this reference voltage would be generated by a bandgap reference circuit. This type of circuit is preferred as it generates a voltage independent of temperature or power supply voltage. The OTA ensures that both of its inputs are at the same voltage, and so Vref is applied to the external resistor Rext (independent of the threshold voltage of transistor M). Hence, the current flowing through the external resistor:

$$Iext=Vref/Rext \qquad (Eq\ 11)$$

Typically a 1% tolerance resistor would be used for Rext: despite the precision, these devices are cheap (<$0.01) and small (<1 mm×1 mm). Hence the accuracy of Iext will be 1% and also largely independent of temperature and power supply voltage.

This current is then mirrored onto Irefp using the conventional transistor mirror shown in FIG. 3. If the size of M=N (i.e. WidthM=widthN & lengthM=lengthN) then the current Irefp will be the same as Iext. Typically, Irefp will be lower than that desired for Iext (a typical value for Rref is 10 kΩ and Vref=1.2V, hence Iext=120 pA), so a ratio of transistors is used. For example if Iref=1.2 pA is required (i.e. 1/100 of Iext), then transistor M is 100× larger than transistor N (i.e. widthM=100×widthN & length M=lengthN). For better matching, it is common practice to use a "unit-cell" approach, i.e. use a transistor of a desired size for N and create transistor M by using multiple instances of this transistor. Preferably these transistors are laid out in a common centroid technique to avoid mismatch due to processing variations.

Thus the current from the first mirror is:

$$Irefp=Iext\times widthN/widthM \qquad (Eq\ 12)$$

and the reference current from the second mirror is:

$$Iref=Irefp\times widthP/widthO \qquad (Eq\ 13)$$

If the desired value of Iref<<Iext (e.g. 1/1000) then instead of having a very large ratio of transistor sizes, it is more practical to have several stages of current mirrors (e.g. three sets with a division of current by 10 in each). Not only is the area required to implement these transistors smaller, but it also easier to size the transistors with the lower current so that they remain in their saturated (or "Strong Inversion") mode of operation.

The reference current as a function of the external resistor can be expressed as:

$$Iref = Vext/Rext \times (widthN/widthM) \times (widthP/widthO) \times \qquad (Eq\ 14)$$

To simplify the mathematics, define the term MG ("Mirror Gain") as the product of the transistor ratios of each stage $$MG = (widthN/widthM) \times (widthP/widthO) \times \qquad (Eq\ 15)$$

Hence:

$$Iref = Vext \times MG/Rext \qquad (Eq\ 16)$$

Implementation of Calibration Circuit

FIG. 4 shows a pixel circuit similar to that of FIG. 1 but with the addition of two switches: one to reference voltage "VRT" controlled by the signal "SHRES" and the other switch to the current reference Iref, controlled by the signal "REFEN". Additionally, FIG. 4 shows circuitry coupled to the output of the comparator. The circuitry includes a memory MEM for storing values including a TOUTR2eff value which is the measured time from a calibration phase as described below. The circuitry further includes a measuring circuit MEAS which functions to make time measurements relative to changing of the comparator output. The circuitry still further comprises a circuit for modifying MOD the measured pixel signal in digital form in accordance with the algorithms described herein to calculate TOUT (accurate).

It is helpful (to simplify the mathematics), but not required, to use the same reset voltage for the S/H capacitor in calibration phase as the reset voltage for the photodiode in operational mode.

The reset voltage for the S/H capacitor is a positive voltage as the reference current Iref is a "sink" i.e. relative to the ground. If the reference current generation is a "source" i.e. relative to a positive voltage, then the S/H reset switch would be connected to ground, but the principle of operation remains the same.

Use of Current Reference in Pixel

FIG. 5 shows a calibration mode of operation of the system. Its operation is similar to the light-sensitive mode illustrated in FIG. 2, except that the photodiode is disconnected from the system and the reference current Iref is used to discharge the Csh capacitor.

Hence, the equations to describe the operation of this mode are similar.

$$VREF2 = VRT - VSH = Iref \times TCAL/Csh \qquad (Eq\ 17)$$

From the conversion phase, COMP will go high after TOUTR2 when VRAMP=VSH $$VRAMP = VSH = VRT - TOUTR2 \times Iramp/Cramp \qquad (Eq\ 18)$$

So $$VRT - VSH = Iref \times TCAL/Csh = TOUTR2 \times Iramp/Cramp \qquad (Eq\ 19)$$

and hence $$Iramp = Iref/(TCAL/TOUTR2) \times (Cramp/Csh) \qquad (Eq\ 20)$$

Substituting Equation 16 and Equation 20 into Equation 6:

$$Iphoto = ((Cpd + Csh)/Csh) \times (TOUT/TOUTR2) \times (TINT/TCAL) \times Vref/Rext \times MG \qquad (Eq\ 21)$$

Equation 21 now shows the photocurrent expressed as a ratio of on-chip components and as function of external resistance. As discussed before, while absolute values of on-chip components is subject to manufacturing variations of 10%, the ratios of components are much better—0.1% is not uncommon (e.g. 10 bit DAC/ADC has 1024 steps).

Use of Calibration in Operation

1 Design Phase

Equation 21 shows theory relevant to this invention. A practical method to implement this is described in this section.

The designer selects the external resistor value (Rext); reference voltage (VREF); current mirror gain (MG); nominal ramp current (Irampnom); nominal S/H capacitance (Cshnom), nominal ramp capacitance (Crampnom), calibrate period (TCAL) and conversion period (TCONV).

The nominal time for the comparator to fire (TOUTR2nom) can be calculated from Equation 16 and Equation 20:

$$TOUTR2nom = TCONV \times (Vext \times MG/(irampnom \times Rext)) \times (Crampnom/Cshnom) \qquad (Eq\ 22)$$

This value (either in seconds, or more usually number of system clock cycles) is stored in the digital logic.

2 Calibration Phase

During the operation of the device, the system calibrates itself. As described previously, the photodiode is disconnected, S/H capacitor is reset and then charged for a preset time using reference current derived from the external resistor. The voltage on the S/H capacitor is measured by measuring the output time from the comparator. This yields the effective value for TOUT2, called TOUT2eff which is stored in a memory MEM.

3 Operation Phase

The calibration current is disconnected from the S/H stage (to reduce power consumption of the device, preferably the reference current generation circuit is powered down) and the circuit operates in a manner similar to that above with reset, integration and conversion.

However, in the prior-art system, the "TOUT×Ksystem" value is used as a measure of illumination levels, but for this embodiment $$\text{Illumination level} = TOUTmeas \times Ksystem\_nom \times TOUTR2eff/TOUTR2nom \qquad (Eq\ 23)$$

where TOUTmeas is the time measured from the illumination/conversion system; TOUTR2nom is the calculated (nominal) time from the calibration phase and TOUTR2eff is the measured time from the calibration phase.

To save on computation, it is probably easier to calculate either a GainScaling value or effective Ksystem and apply that to the output.

$$GainScaling = TOUTR2eff/TOUTR2nom \qquad (Eq\ 24)$$

so that:

$$\text{Illumination level} = TOUTmeas \times Ksystem\_nom \times GainScaling \qquad (Eq\ 25)$$

or alternatively to Equation 24:

$$Ksystem\_effective = Ksystem\_nom \times TOUTR2eff/TOUTR2nom \qquad (Eq\ 26)$$

$$\text{Illumination level} = TOUTmeas \times Ksystem\_effective \qquad (Eq\ 27)$$

Worked Example

TABLE 1

Table 1 Worked example - Calibration with Iramp 30% higher than nominal

| Value | Nominal | Actual |
|---|---|---|
| Csh | 42 Pf | 42 Pf |
| Cramp | 10 Pf | 10 Pf |
| Vref | 1.2 V | 1.2 V |
| Rext | 10 Kω | 10 Kω |

TABLE 1-continued

Table 1 Worked example - Calibration with Iramp 30% higher than nominal

| Value | Nominal | Actual |
|---|---|---|
| Iext | 120 Ma | 120 Ma |
| MG | 24.5E−6 | 24.5E−6 |
| Iref | 2.9 Na | 2.9 Na |
| TCAL | 10 ms | 10 ms |
| Iramp | 1.4 Na | 1.82 Na |
| TOUTR2 | 5 ms | 3.85 ns |

Table 1 shows a system with the designed (nominal) values, but where, due to variations in the manufacturing process, the current generated for the ramp is 30% higher than nominal. The nominal time for the comparator to fire in the calibration phase is 5 ms, but the actual time is 3.85 ms.

The device has a photodetector 100 μm×100 μm(=10E−9 m$^2$) with QE of 60%. At 550 nm, the energy of each photon is 361.1E−21J (h×c/lambda), so 0.1 W/m$^2$ of light of this color will produce a photocurrent of 0.1×10E9×0.6×e/361.1E21=266 Pa.

The capacitance of a 100 μm×100 μm photodiode will be around 1 Pf, so the capacitance of the sample/hold (42 Pf) will dominate.

With TINT of 50 ms, a 266 Pa current will cause the 42 Pf S/H capacitor to decay by 316.5 Mv.

TABLE 2

Table 2 Worked example - Operation with Iramp 30% higher than nominal

| Value | Nominal | Actual |
|---|---|---|
| Csh | 42 Pf | 42 Pf |
| Cramp | 10 Pf | 10 Pf |
| TINT | 50 ms | 50 ms |
| Iphoto | 266 Pa | 266 Pa |
| Iramp | 1.4 Na | 1.82 Na |
| TOUT | 2.26 ms | 1.75 ms |

Table 2 shows that with the higher than expected ramp current, the output time is only 1.75 ms instead of 2.26 ms.

Figure 6:
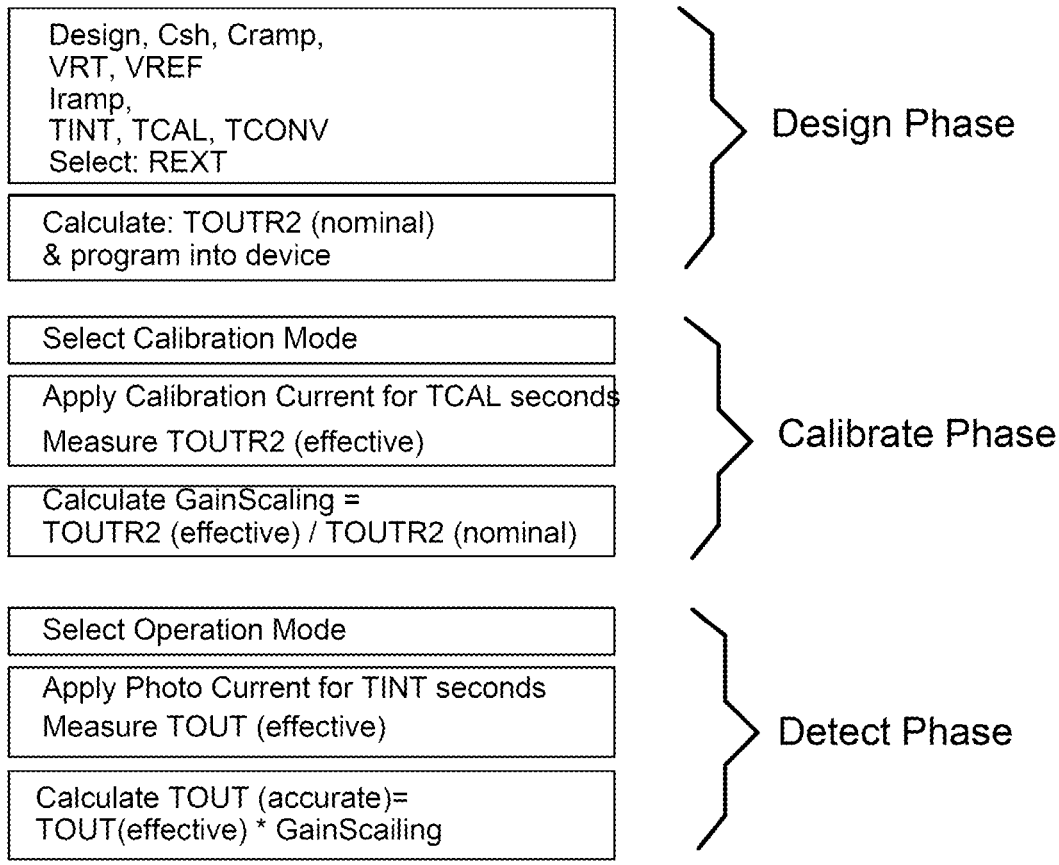
FIG. 6 is a flow chart illustrating the use of the sensor.

However, when the formula shown in Equation 23 is applied, Calibrated TOUT=1.75 ms×5 ms/3.85 ms=2.26 ms Flow Chart FIG. 6 shows the flow of operation. Of course, the design phase happens only once. The calibration phase may operate once at power up, or the sensor may calibrate every cycle (i.e. repeated calibrate, measure) or the sensor may calibrate after a pre-determined number of times (i.e. repeat: calibrate, measure Xn); or the sensor may calibrate when it is commanded by an external controlling device; or a combination of the above.

Figure 7:
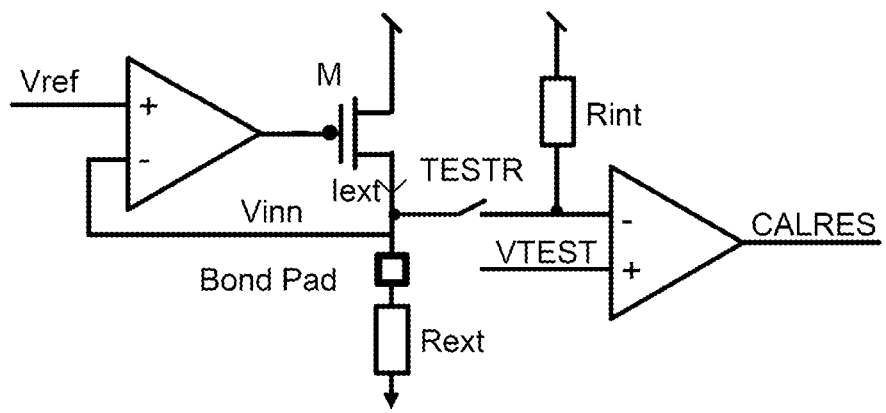
FIG. 7 is a schematic showing an alternative embodiment.

FIG. 7—Alternative Embodiment

FIG. 7 shows an improvement to the circuit in FIG. 3. Note that for clarity in FIG. 7 the current mirrors are not shown.

An internal resistance Rint is connected via a switch to the external resistor Rext and the power rail. To check if an external resistor is fitted or not, the signal TESTR goes high to close the switch and connects Rext to Rint and the comparator. If the external resistor "Rext" is fitted, then there will be a current flowing through it and the voltage at the inverting input to the OTA ("Vinn") will be the same as the Vref.

If the external resistor "Rext" is not fitted, then Rint will pull this node high and the voltage at the inverting input to the OTA ("Vinn") will be very close to the supply voltage ("Vdd").

The value of resistor Rint is not critical, but it should be significantly higher (e.g. 10×) than that of Rext not to significantly affect the operation of the circuit. As this could be a high value, the resistance could be formed as a standard resistor (e.g. using polysilicon, or an implant) or also using an "active resistor" i.e. one where the gate and drain are connected together.

VTEST is typically supplied by the voltage reference circuit blocks. Its value is not critical, but a good level would be half way between the VREF voltage and supply voltage. Hence the output from the comparator ("CALRES") will go low.

TABLE 3

Table 3 CALRES output as function of external resistor

| Resistor | Vinn | CALRES |
|---|---|---|
| Fitted | Vref | High |
| Not fitted | Vdd | Low |

Once the presence of the Rext resistor has been verified, the TESTR should go low to isolate the internal resistor from the external resistor in order that the reference current calibration operates accurately.

It would be possible to detect the presence of the Rext resistor only once—at power up—but optimally this would be done before every calibration, in case the Rext resistor became disconnected (e.g. poor solder joint, damage etc.).

If this circuit determines that the external resistor has been fitted, then the system should perform the calibration routine as shown in FIG. 6 and apply it as given by Equation 25 or Equation 27.

If this circuit determines that the external resistor has not been fitted, then the system should not perform the calibration routine. The device should then use unity as the gain scaling factor.

Figure 8:
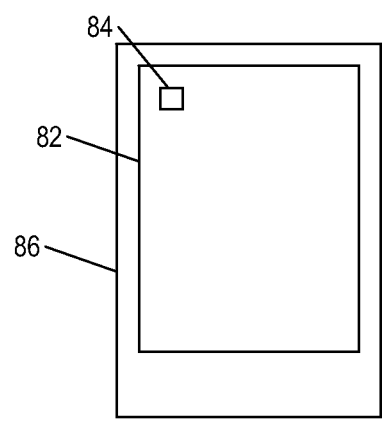
FIG. 8 illustrate a mobile device including an ambient light sensor.

Reference is now made to FIG. 8 which illustrates a mobile device including an ambient light sensor. FIG. 8 shows a display device 82 including an ambient light sensor 84 as defined above, and in which the output of the ambient light sensor is used to control the contrast or backlighting of the display device. A mobile device 86 is shown that includes such a display device 82, the mobile device is selected from the group comprising a mobile telephone, a camera, a personal digital assistant, and a portable personal computer.

What is claimed is:

1. A method, comprising:
   operating a light sensor in a calibration mode by:
      disconnecting for the duration of the calibration mode a capacitor from a light-sensitive pixel including a photodiode having a first terminal and a second terminal;
      applying a photodiode reset voltage to charge said capacitor during a first time period;
      supplying a regulated reference analog current different from the photodiode reset voltage to discharge said capacitor during a second time period which subsequently follows the first time period;
      converting in said capacitor the regulated reference analog current over a calibration period of time to provide a calibration analog voltage;
      converting the calibration analog voltage to a digital calibration signal in an analog-to-digital converter circuit; and
      storing the calibration digital signal; and operating the light sensor in a light sensing mode by:
applying said photodiode reset voltage to one of the first or second terminals of the light sensitive pixel;
connecting said capacitor to one of the first or second terminals of the light sensitive pixel;
converting in said connected capacitor an analog current generated at said one of the first or second terminals over an integrating period of time in response to received light to provide a pixel analog voltage;
converting the pixel analog voltage to a digital pixel signal in said analog-to-digital converter circuit; and
adjusting the digital pixel signal as a function of the digital calibration signal to generate a corrected pixel signal.

2. The method of claim 1, in which the calibration mode is performed only at switch-on.

3. The method of claim 1, in which the calibration mode is performed cyclically.

4. The method of claim 1, wherein adjusting comprises calculating a gain scaling factor from said digital calibration signal and applying the gain scaling factor to said digital pixel signal to generate said corrected pixel signal.

5. The method of claim 4, further comprising storing a nominal time for the analog-to-digital converter circuit output to change state, wherein the digital calibration signal is indicative of an effective time for the analog-to-digital converter to change state, and wherein the gain scaling factor is calculated as a function of the effective time divided by the nominal time.

6. A light sensor comprising:
a light-sensitive pixel comprising a photodiode having a first terminal and a second terminal;
a capacitor selectively coupled to one of the first or second terminals of the photodiode;
a timing circuit configured to operate in a calibration mode to apply a reset voltage to said capacitor during a first time period when the capacitor is not coupled to the photodiode and operate in a light sensing mode to apply said reset voltage to the photodiode when the capacitor is coupled to the photodiode;
wherein the capacitor is configured to convert an analog current generated at said one of the first or second terminals of the photodiode over an integrating period of time during the light sensing mode in response to received light to provide a pixel analog voltage;
a reference signal source configured to supply a regulated reference analog current different from the photodiode reset voltage to said capacitor during a second time period that subsequently follows said first time period for the calibration mode;
wherein the capacitor is further configured to convert the regulated reference analog current over a calibration period of time during the calibration mode to provide a calibration analog voltage;
an analog-to-digital converter having an input terminal configured in the light sensing mode to convert the pixel analog voltage to a digital pixel signal and configured in the calibration mode to convert the calibration analog voltage to a digital calibration signal;
a memory configured to store the digital calibration signal; and
a modifying circuit configured to modify the digital pixel signal as a function of said digital calibration signal.

7. The light sensor according to claim 6, further comprising switching circuitry operable in said light sensing mode to connect the analog current at said one of the first or second terminal of the photodiode to said capacitor and disconnect the regulated reference analog current from said capacitor and operable in said calibration mode to connect the regulated reference analog current to said capacitor and disconnect the analog current at said one of the first or second terminals of the photodiode from said capacitor.

8. The light sensor according to claim 6, further comprising a current source configured to generate the regulated reference analog current, said current source comprising a reference voltage applied across a reference resistor and wherein the light sensor forms part of an integrated circuit, and the reference resistor is external to the integrated circuit.

9. The light sensor according to claim 6, wherein an output of the modifying circuit is used to control the contrast or backlighting of a display device.

10. The light sensor according to claim 9, wherein the display device is part of a mobile device, the mobile device being selected from the group consisting of a mobile telephone, a camera, a personal digital assistant, and a portable personal computer.

11. A light sensor comprising:
a light-sensitive pixel comprising a photodiode having a first terminal and a second terminal;
a first switch directly connected between one of the first or second terminals of the photodiode and a node;
a capacitor directly connected between the node and a reference node, the capacitor configured to convert an analog current generated at said one of the first or second terminals of the photodiode to provide an analog voltage;
a second switch directly connected between the node an a reset voltage;
an analog-to-digital converter having an input terminal connected to the node and configured to convert said analog voltage to a digital pixel signal;
a reference current source configured to generate a regulated reference analog current; and
a third switch directly connected between the reference current source and the node and configured to apply the regulated reference analog current to the node;
wherein the first switch is closed and the second and third switches are open in an imaging mode and wherein the first switch is open and the second switch is closed for a first time period and the third switch is closed for a second time period that subsequently follows the first time period in a calibration mode.

12. The sensor of claim 11, in which the calibration mode is performed only at switch-on.

13. The sensor of claim 11, in which the calibration mode is performed cyclically.

14. The sensor of claim 11, further comprising:
a memory configured to store a reference value output from the analog-to-digital converter when the regulated reference analog current is applied to the capacitor; and
a modifying circuit configured to modify the digital pixel signal in dependence on said reference value.

15. The sensor of claim 11, in which an output of the light sensor is used to control the contrast or backlighting of a display device which includes the light sensor.

16. The sensor of claim 15, in which the display device is part of a mobile device, the mobile device being selected from the group consisting of a mobile telephone, a camera, a personal digital assistant, and a portable personal computer.

17. A light sensor circuit, comprising:
a light-sensitive pixel comprising a photodiode having a first terminal and a second terminal;
a capacitor;
an analog-to-digital converter coupled to said capacitor;
a reference current source configured to generate a regulated reference analog current; and switching circuitry configured to selectively couple the photodiode to the capacitor and selectively couple a reset voltage to the photodiode and the capacitor, said switching circuitry operable in:
- a calibration mode wherein the photodiode is not coupled to the capacitor and the reset voltage is temporarily connected to charge the capacitor and the regulated reference analog current is subsequently connected to discharge the capacitor; and
- a light sensing mode wherein the photodiode is coupled to the capacitor and the reset voltage is temporarily connected to charge the photodiode and the regulated reference analog current is not connected to the capacitor;

wherein said analog-to-digital converter is configured to convert a capacitor voltage at the end of the calibration mode to a digital calibration signal;

wherein said analog-to-digital converter is further configured to convert the capacitor voltage at the end of the light sensing mode to a digital pixel signal; and a modifying circuit configured to modify the digital pixel signal as a function of said digital calibration signal to generate a corrected pixel signal.

18. The circuit of claim 17, wherein the calibration mode is performed at switch-on of the circuit.

19. The circuit of claim 17, wherein the calibration mode is performed cyclically by the circuit.

20. The circuit of claim 17, wherein the modifying circuit is configured to generate a gain scaling factor from said digital calibration signal and apply the gain scaling factor to said digital pixel signal to generate said corrected pixel signal.

21. The circuit of claim 20, further comprising a memory configured to store a nominal time for the analog-to-digital converter circuit output to change state, wherein the digital calibration signal is indicative of an effective time for the analog-to-digital converter to change state, and wherein the gain scaling factor is generated as a function of the effective time divided by the nominal time.

* * * * *